Patented Oct. 10, 1950

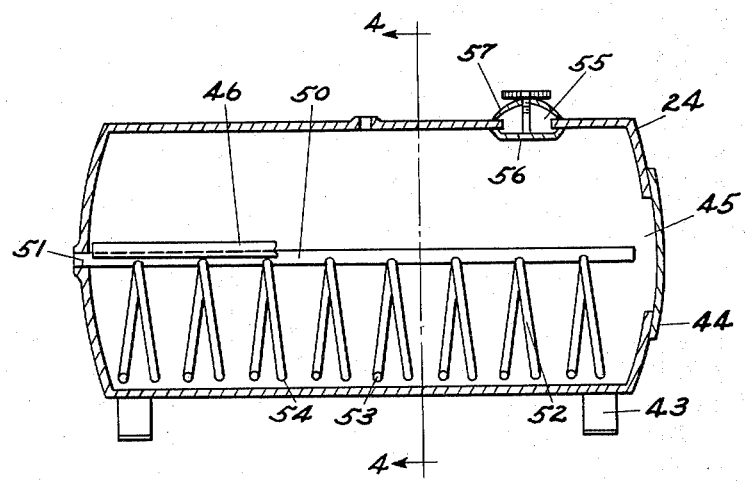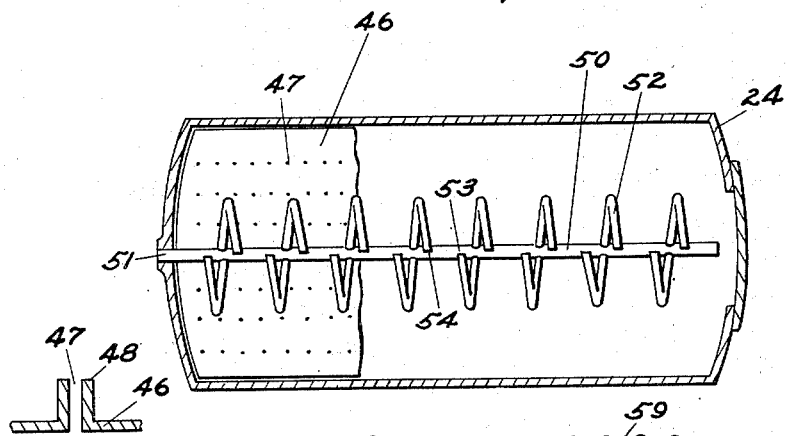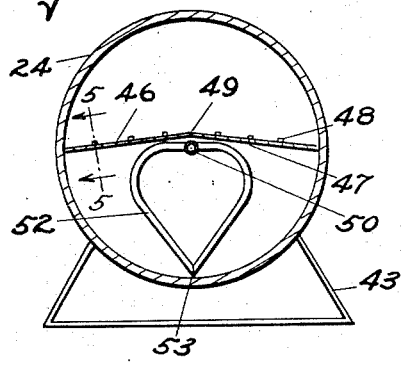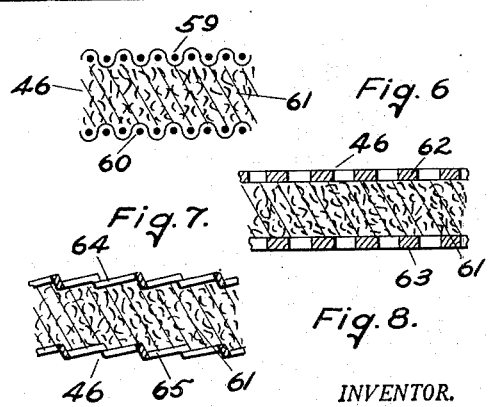

2,525,597

UNITED STATES PATENT OFFICE 2,525,597

APPARATUS FOR PRODUCING COMBUSTIBLE GAS

Donald Wooster Frazey, Summit, Ill.

Application August 14, 1946, Serial No. 690,542

2 Claims. (Cl. 261—124)

1

The present invention relates to an apparatus and method for producing combustible gas-vapor mixtures which are of the type which are directly utilizable for heating, lighting, metal-cutting, and the like.

In many industrial applications where the use of a combustible gas is necessary, conditions are often encountered where a supply of piped gas of this kind is not available or convenient, under which conditions it has been customary to employ what is known as "bottled gas," which usually consisted of a normally gaseous hydrocarbon confined under sufficient pressure so that it would remain liquid at ordinary atmospheric temperatures, but which would rapidly be converted into the gaseous state upon being allowed to escape from the confining pressure vessel.

Gases suitable for that purpose have usually been propane or butane, both of which are substantially gaseous at room temperatures, but which can be kept in liquid condition under moderate superatmospheric pressure. However, when evolving gas from the containers of such a liquefied gas, the latent heat of vaporization is such that a considerable lowering in temperatures takes place, particularly when large amounts of the gas have been consumed, as for instance in industrial applications, such as metal cutting, welding, and large scale heating.

Moreover, when so called "bottled gas" is utilized as a source of gas, it is essential that the cylinders or other containers in which the gas is handled be kept in an upright condition so that only vapor but no liquid will leave the apparatus. Moreover, the pressure under which the liquid "bottled gas" is confined is fairly high, at least a good deal higher than is desirable for the utilization of the gas. It has therefore been customary to employ expensive and elaborate pressure reducing valves through which the gas is fed to the eventual point of use such as a gas stove, gas heater, furnace, blow torch, cutting or welding tool, and the like.

It is one of the objects of the present invention to provide a source of combustible gas from a combustible liquid sufficiently volatile readily to lend itself to vaporization without the necessity for heating the same, but which is nevertheless of such a nature that it does not require confinement under superatmospheric pressure.

A further object of the invention is to provide an apparatus for generating a mixture of a gas and a combustible vapor which is small enough so as to be readily potable and which may, if desired, be supported upon a suitable small vehicle

2 which is readily pulled around a shop or factory, where it may be used.

Still a further object of the invention is to provide a special type of apparatus in which a mixture of dry combustible vapor and air may be obtained with a minimum of effort and under positively and easily controlled conditions.

Further objects of the invention will become manifest from the further description hereinbelow considered in connection with the two sheets of drawings, in which Fig. 1 is a pictorial plan view of the apparatus supported upon a suitable vehicle;

Fig. 2 is a longitudinal section through that portion of the apparatus in which the combustible gas-vapor mixture is produced, with some parts broken away;

Fig. 3 is a horizontal section through the apparatus viewed from the bottom, also showing a portion of a longitudinally extending foraminate plate provided with upwardly therefrom extending jets;

Fig. 4 is a cross section through the apparatus along the line 4—4 of Fig. 2;

Fig. 5 is a cross-sectional view, on an enlarged scale, along line 5—5 of Fig. 5, and Figs. 6, 7 and 8 are cross-sectional views, also on an enlarged scale, of portions of modified forms of foraminate plates.

Figure 1:
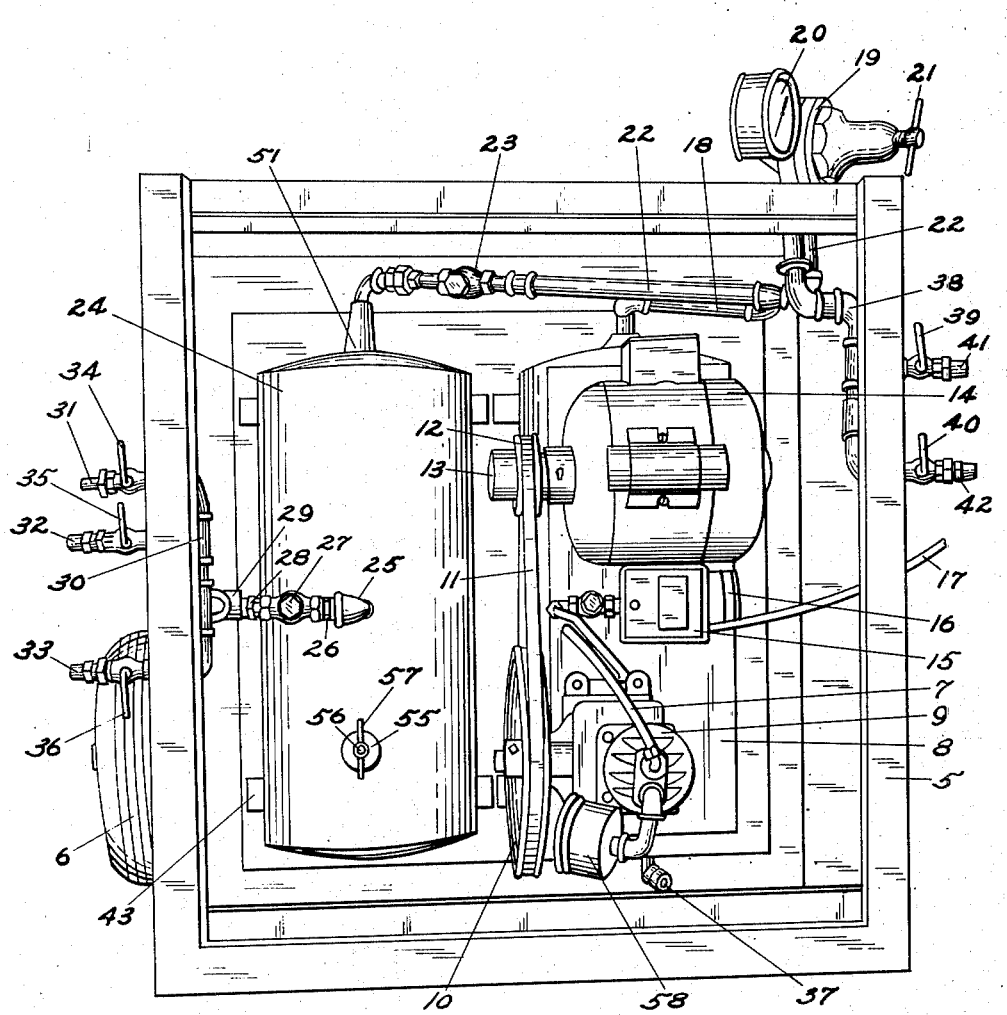

The process of the present invention comprises, in essence, the introduction of a carrier gas, such as air, nitrogen, carbon dioxide, etc., under relatively low pressure underneath the surface of a volatile combustible liquid under conditions of considerable turbulence so that the bubbles of the gas will pass through the liquid and as a result the partial pressure effect will volatilize a considerable quantity of the liquid, thus producing a mixture of the vapor of the liquid and of the introduced gas, whereafter this mixture is passed through foraminate means for the purpose of removing from the mixture any entrained vesicles of the liquid so that a relatively "dry" gas-vapor mixture will result, which is then passed, under the same low pressure, to the point of use.

The apparatus, particularly as illustrated in Fig. 1, which is a preferred form of the embodiment, and which is shown for exemplificative purposes only, but is not to be construed as a limitation upon the invention, is seen to consist of a suitable vehicle 5 which is supported upon a suitable under-carriage which is supported, for instance, upon pneumatic-tired wheels 6, the vehicle also being capable of being pulled by any suitable means. Supported upon the vehicle in any suitable way is an air pressure tank 8 which may be of the usual cylindrical type having convex ends and which is supported with its longitudinal axis horizontally, and parallel to the floor of the vehicle 5.

Mounted upon this tank 8 is an air compressor 9 which is operated through the intermediation of the pulley 10 and belt 11 from the pulley 12 mounted on the shaft 13 of a prime mover 14, which may be an electric motor, internal combustion engine, or the like. If it is an electric motor, it may be operated through the intermediation of a motor-control unit 15 of the usual construction and which serves to shut off the motor 14 when the pressure in the tank, ascertainable from the gauge 16, reaches a certain predetermined limit, say 40 to 60 pounds per square inch gauge pressure. The air is filtered through filter 58 before entering the compressor.

Current for operating the motor 14 is provided through the cable 17 which is attached to a source of electric current supply (not shown). The air leaves the air compressor 9 through pipe 7, and enters tank 8 until the pressure has reached the desired point, whereafter the motor control unit 15 will shut off the motor as well as the compressor.

Air from the compressor air tank 8 leaves the same through pipe 18 and enters the pressure reducing valve 19 which is provided with a gauge 20 and an operating handle 21, by means of which the pressure reducing valve can be set so as to discharge air through the pipe 22 which conducts the low pressure air through the check valve 23 into the gas producing vessel 24 which latter is of special construction as shown in Figs. 2, 3, and 4, as will be elaborated upon hereinbelow. The gas-vapor mixture produced in the vessel 24 leaves the same through gas-eduction pipe 25, and passes through two flame arrestors 26 and 28 and a thereof intermediate check valve 27 to a pipe 29 which leads into a manifold 30 from which extend a plurality, for example, three, supply pipes 31, 32 and 33, which are, respectively, provided with shut off cocks 34, 35 and 36, and which lead to the point of utilization of the produced mixture of gas and vapor. A charging opening 55, provided with a suitable closure 56 and yoke 57 is provided on the top of vessel 24. The pressure tank 8 is also provided with a safety valve 37.

A branch line 38 leads from the high pressure side of the pipe 18 to a number of valves 39 and 40, which lead to hose-nipples 41 and 42 through which a supply of air under the pressure in tank 8 may be obtained, as for example to work an air blast lamp, tire-inflation pump or the like.

The construction of the gas-vapor mixture producing tank 24 can best be seen from Figs. 2, 3 and 4. It consists essentially of a shell 24 which is horizontally disposed and supported on suitable supports 43. The vessel 24 is closed at one end by means of the plate 44 which may be either welded, riveted, or bolted in position. The opening 45 which it closes is large enough to admit of the insertion of a centrally and horizontally extending foraminate jet plate 46 which is provided with a large number of fine jets 47 which may be made by taking a relatively fine metal plate and punching holes into it in such a manner that a certain amount of metal will protrude from one (preferably the upper) side of the plate or baffle 46 forming small protuberances 48 (see Fig. 4). There are shown on an enlarged scale on Fig. 5, in somewhat idealized form. They act in the nature of jets, the mixture of air and vapor being thoroughly blended by passage therethrough.

This baffle 46 is preferably of the shape shown in Fig. 4, and is substantially at the center of the vessel 24 as to each longitudinal side thereof, but is either arched or extends to a point 49 slightly above the longitudinal axis of the vessel 24.

Positioned substantially directly below the center of the baffle plate 46 is a longitudinal air induction pipe 50, which enters the vessel 24 through an opening 51 located on the side opposite the opening 45. Issuing from the air induction pipe 50 there are a plurality (for example sixteen) of dependent agitating pipes 52, some of which are curved in one direction and some in the opposite direction, with the ends, however, so positioned that their terminal openings 53 and 54 are opposed in direction so that any air or gas issuing from said openings will tend to flow along the cylindrical inner surface of the floor wall of the vessel 24, thereby producing considerable turbulence in the liquid.

A suitable combustible and highly volatile liquid, for example, pentane or hexane, or a so-called "stove and lighting" gasoline, is filled into the vessel, to a level about three fourths of the distance to the baffle 46, through the filling opening 55, whereafter the closure 56 thereon is replaced. Thereafter the cable 17 is attached to a suitable source of electric power, thereby actuating the motor 14 and driving the air compressor 9 so that eventually air pressure, say of from 40 to 60 pounds, will be built up in the pressure tank 8. Thereafter, by means of pressure reducing valve 19, a sufficient amount of air is allowed to pass through the pipe 22 into the pipe 50, the air escaping from the bottom of the pipes 52 through openings 53 and 54 which are in opposed directions so that a stream of air bubbles will sweep along the bottom of the tank 24 and rise upwardly through the volatile liquid therein contained. By reason of the position of these pipes, and the direction of the discharge of the air, and particularly because they point alternately in opposite directions, there will be produced oppositely directed currents of liquid as well as air, thereby adding greatly to the turbulence, thus assuring a very intimate contact of the air or gas bubbles with the liquid that is to be vaporized. In so doing it will of course vaporize a considerable portion of the liquid, the vapor of which has already occupied a good deal of the space above the baffle 46. Due to the vapor carrying properties of the air or other gas introduced, a considerable further quantity of vapor will be brought into the space above the baffle 46 and at the same time a slight internal pressure will be built up in the tank 24 corresponding of course to the pressure as it has been set by the pressure reducing valve 19. The mixture of air and vapor passes through jets 47 in plate 46, so that any vesicles of liquid will be trapped and caused to fall back into the liquid in the tank 24.

As a result of this, a mixture of gas and combustible vapor will escape from the pipes 31, 32, 33, whichever one happens to be open. By means of suitable tubing (not shown) this mixture of gas and volatile vapor can be sent to any desired point, where it can either be burned directly or by means of a burner where it may be burned either at atmosphere pressure or under superatmospheric pressure, if compressed air be used to enhance the combustion of the gas. Instead of air, oxygen may of course be used, in order to get still a hotter flame. The vehicle 5 may hence support a cylinder of oxygen (not shown).

The amount of air or gas which is mixed with the vapor in tank 24 must of course preferably be kept below the explosive limit. In other words, the gas which issues from the pipes 31, 32 or 33 must not be an explosive mixture, as otherwise there would be danger of blowing up tank 24 and its contents. In order, however, to definitely guard against this danger, two flame arresters 26 and 28, already mentioned, are employed. These consist of a series of fine screens between which there may additionally be housed a certain amount of fine steel wool, aluminum wool, or the like. As such flame propagation arresters are well known, they need no further description herein.

The jet plate 46 may, if desired, be replaced by other forms of foraminate plates, such as illustrated in Figs. 6, 7 and 8, which show portions of such plates, on a somewhat enlarged scale. Thus Fig. 6 illustrates a plate made from two superposed pieces of wire-cloth or the like 59 and 60 between which is positioned a mass of steel wool, mineral wool or glass wool 61. The mixture of air and vapor in passing through such a combined structure will be thoroughly blended, in a manner similar to the blending accomplished by the jets 48.

The plate 46 may also take the form shown in Fig. 7, where two superposed perforated plates 62 and 63 serve to confine an intermediate mass of steel wool, mineral wool, or glass wool 61. In the form shown in Fig. 8, the perforated metal is replaced by two layers of expanded metal 64 and 65.

All of these various forms of foraminate plates are to be considered as substantial equivalents for the purposes of the present invention.

While an electric motor has been described as the prime mover for the air compressor, such motor may be replaced by an internal combustion engine, such as a gas engine or gasoline engine. The gas produced in the vessel 24 may serve as a source of fuel for such a prime mover, thus making the unit self-contained and independent of a source of electric power. A suitable type of carburetor will of course have to be supplied for such internal combustion engine, but this is well within the skill of the art. Alternatively, and by means of a suitable fuel pump, such internal combustion engine might use the liquid contained in tank 24 as a direct source of fuel.

The apparatus therefore enables the production of a constant supply of a combustible gas-vapor mixture under a pressure low enough to permit it to be fed to suitable burners or cutting tools and the like, without the necessity of using so-called "bottled gas" which is under superatmospheric pressure due to its low boiling point.

It will of course be obvious that other liquids than pentane and hexane may be used, such for example as light gasolines, benzenes and the like, and the invention is not to be circumscribed by the particular volatile liquid employed.

The exact spatial arrangement of the various parts of the apparatus need of course not at all be like that shown in Fig. 1, but may be arranged in any manner which may suit the convenience of the constructor of the apparatus, provided only that it comes within the scope of the hereunto appended claims.

What is believed to be new and is claimed as the invention is as follows:

1. Apparatus for producing combustible gas comprising the combination of a horizontally disposed cylindrical tank, a perforate partition longitudinally dividing the tank into an upper and a lower chamber, means for introducing a gas into the bottom of the lower chamber including a conduit arranged axially through the chamber, a plurality of pairs of pipes connected therewith and terminating in laterally and oppositely disposed nozzles having orifices substantially tangential to the inner surface of the chamber, means to supply gas under pressure to said conduit, and means for educting a mixture of gas and vapor from the upper chamber.

2. Apparatus for producing combustible gas comprising the combination of a horizontally disposed cylindrical tank, a perforate partition longitudinally dividing the tank into an upper and a lower chamber, means for introducing a gas into the bottom of the lower chamber including a conduit arranged axially through the chamber, a plurality of pairs of curved pipes connected therewith and terminating in laterally and oppositely disposed nozzles having orifices substantially tangential to the inner surface of the chamber, means to supply gas under pressure to said conduit, and means for educting a mixture of gas and vapor from the upper chamber.

DONALD WOOSTER FRAZEY.

REFERENCES CITED

The following references are of record in the file of this patent:

UNITED STATES PATENTS

| Number | Name | Date |
|---|---|---|
| 174,054 | Allen | Feb. 29, 1876 |
| 206,453 | Howarth | July 30, 1878 |
| 354,709 | Keyes | Dec. 21, 1886 |
| 695,399 | Kinsey | Mar. 11, 1902 |
| 1,069,835 | Johnson | Aug. 5, 1913 |
| 1,103,789 | Macey | July 14, 1914 |
| 1,916,577 | Lorimer | July 4, 1933 |
| 2,000,443 | Hechenbleikner | May 7, 1935 |

FOREIGN PATENTS

| Number | Country | Date |
|---|---|---|
| 29,607 | Great Britain | Dec. 17, 1909 |
| 79,769 | Switzerland | May 16, 1919 |